United States Patent
Matsumoto et al.

(10) Patent No.: US 7,221,364 B2
(45) Date of Patent: *May 22, 2007

(54) IMAGE GENERATING APPARATUS, IMAGE GENERATING METHOD, AND COMPUTER PROGRAM

(75) Inventors: Reiji Matsumoto, Tsurugashima (JP); Hajime Adachi, Tsurugashima (JP)

(73) Assignee: Pioneer Corporation, Tokyo-To (JP)

( * ) Notice: Subject to any disclaimer, the term of this patent is extended or adjusted under 35 U.S.C. 154(b) by 285 days.

This patent is subject to a terminal disclaimer.

(21) Appl. No.: 10/253,702

(22) Filed: Sep. 25, 2002

(65) Prior Publication Data

US 2003/0071807 A1  Apr. 17, 2003

(30) Foreign Application Priority Data

Sep. 26, 2001  (JP) .............................. 2001-295152

(51) Int. Cl.
G06T 15/00 (2006.01)

(52) U.S. Cl. ...................................... 345/419; 701/200

(58) Field of Classification Search ................. 345/420, 345/419
See application file for complete search history.

(56) References Cited

U.S. PATENT DOCUMENTS

| | | | | |
|---|---|---|---|---|
| 5,189,430 A * | 2/1993 | Yano et al. | ................. | 342/457 |
| 5,872,572 A * | 2/1999 | Rossignac | .................. | 345/428 |
| 5,925,091 A * | 7/1999 | Ando | .......................... | 701/212 |
| 5,941,934 A * | 8/1999 | Sato | ............................ | 701/217 |
| 6,169,552 B1 * | 1/2001 | Endo et al. | .................. | 345/427 |
| 6,175,802 B1 | 1/2001 | Okude et al. | | |
| 6,324,469 B1 * | 11/2001 | Okude et al. | ................ | 701/208 |
| 6,421,604 B1 * | 7/2002 | Koyanagi et al. | ........... | 701/208 |
| 6,433,792 B1 * | 8/2002 | Yaron et al. | ................. | 345/669 |
| 6,480,786 B2 * | 11/2002 | Watanabe et al. | ........... | 701/211 |

FOREIGN PATENT DOCUMENTS

| | | |
|---|---|---|
| JP | A 8-16822 | 1/1996 |
| JP | A 8-75480 | 3/1996 |
| JP | A 9-62179 | 3/1997 |
| JP | A 9-292830 | 11/1997 |
| JP | A 10-21420 | 1/1998 |
| JP | A 11-174952 | 7/1999 |
| JP | A 11-232484 | 8/1999 |
| JP | A 2000-293705 | 10/2000 |

OTHER PUBLICATIONS

Computer Graphics: Principles and Practice. Foley et al. Addison-Wesley Publishing Company, Inc. 1997. pp. 166-170; 873-874.*

* cited by examiner

Primary Examiner—Kee M. Tung
Assistant Examiner—Peter-Anthony Pappas
(74) Attorney, Agent, or Firm—Young & Thompson

(57) ABSTRACT

An image generating apparatus (1) is provided with: a drawing application processor (11) for indicating a drawing device (13) to generate a 3D image; and a graphics library (12). The drawing application processor separates information to generate the image into coordinate transformation information and drawing object information and generates both with two independent generating devices respectively, and the graphics library stores and manages these information. The drawing device generates the 3D image on the basis of these stored and managed information and outputs it to a display device. The drawing object information is prepared for a broader area than the area of a field of view corresponding to the 3D image to be displayed this time.

23 Claims, 10 Drawing Sheets

IMAGE GENERATING APPARATUS, IMAGE GENERATING METHOD, AND COMPUTER PROGRAM

BACKGROUND OF THE INVENTION

1. Field of the Invention

The present invention relates to an image generating apparatus for and an image generating method of generating a three-dimensional (3D) image on the basis of three-dimensional coordinate information, which is applied to a navigation system or the like, and a computer program to perform the image generating method.

2. Description of the Related Art

Recently, the research development of an electronic control for controlling a drive of a car and the spread of a navigation system for supporting a drive are remarkable. In general, the navigation system is basically designed so as to have various databases and to display map information, current position information, various guidance information, etc. on a display unit. Moreover, such a navigation system is typically designed so as to search for a drive route in accordance with an input condition. It is further designed so as to display the searched drive route and a current position based on a GPS (Global Positioning System) measurement or a self-contained measurement on a map and carry out guidance (navigation) to a destination.

Moreover, in some types of navigation systems, a view on a front side from a currently driving point in addition to the drive route is displayed on a display unit. In addition, an indication of a driving lane, a direction to be curved at a crossing, a distance to a crossing, a distance to a destination, an arrival expectation time and the like are displayed. In such navigation systems, the forward view is displayed as a 3D image in perspective, which is a technique for drawing a 3D image on a plane on the basis of view point of a viewer.

Furthermore, some types of navigation systems is designated to change the forward view displayed as a 3D image according to an advance of a car in order to reproduce the change of the actual view that a driver watches in the car through the front window of the car while driving.

By the way, in order to display a 3D image that continuously changes, it is required to calculate enormous map data containing three-dimensional coordinate information at a high speed, input the data obtained by calculating to a drawing device one after another, and generate many 3D images in a shot time. In response to such a requirement, the technique that a display list is generated by mixing drawing object information indicating objects to be drawn such as a road, a building and so on and the coordinate transformation information indicating a view point, a field of view, a light source and so on, and a 3D image is generated at a time by using the display list. For example, the display list of OpenGL developed by Silicon Graphics Inc. has such a construction (Incidentally, OpenGL is a trademark of Silicon Graphics Inc.). However, if the image generating apparatus is applied to a navigation system or the like, it is required to generate the 3D images successively in real time in order to reproduce a view that successively changes, such as a landscape watched from a moving car or the like. As the movement of a car is fast, the landscape quickly changes. Therefore, it is required to generate 3D images at a very high speed. For this reason, if the generating of the display list is carried out at every 3D image corresponding to the changing view, it is impossible to reproduce the continuous and smooth change of the view as 3D images, because it takes a long time to generate the display list for each 3D image.

Also, there is a technique that can store image information of a region wider than a display region in a larger frame buffer and instantly display the image when the display region is moved within the range. This technique can be used for a simple 2D image. However, it cannot be used for a 3D image, because the view to be displayed as the 3D image variously changes with the change of a view point, and therefore, it is impossible to generate and store in advance all of the 3D images corresponding to the various changes of the view point even if a large capacity memory is prepared.

SUMMARY OF THE INVENTION

It is therefore an object of the present invention to provide an image generating apparatus and an image generating method which can generate continuously changing 3D images at a high speed, and to provide a computer program to perform the image generating method.

The above object of the present invention can be achieved by an image generating apparatus for drawing a three-dimensional image, provided with: a drawing object information generating device for generating drawing object information, which is information for drawing objects as the three-dimensional image, in a single coordinate system; a coordinate transformation information generating device for generating coordinate transformation information, which is information for defining at least one of a view point and a field of view concerning the three-dimensional image; a drawing object information storing device for storing the drawing object information; a coordinate transformation information storing device for storing the coordinate transformation information; and a drawing device for carrying out an image generating process of generating the three-dimensional image by using the stored drawing object information and the stored coordinate transformation information. In this image generating apparatus, the drawing object information generating device generates, in advance, not only the drawing object information corresponding to the objects to be displayed in the image generating process that carries out now but also the drawing object information corresponding to other objects that expected to be displayed in the image generating process that carries out at a different time, the drawing object information storing device stores the generated drawing object information corresponding to said other objects, and the drawing device generates the three-dimensional image corresponding to said other objects by using the drawing object information corresponding to said other objects stored in advance.

According to the image generating apparatus of the present invention, the information used to generate a three-dimensional image, that is, the coordinate transformation information and the drawing object information are separately generated by the independent devices, that is the coordinate transformation information generating device and the drawing object information generating device. Also, these two kinds of information are separately stored and managed by the independent devices, that is, the coordinate transformation information storing device and the drawing object information storing device. Then, the drawing device generates the three-dimensional image on the basis of the stored coordinate transformation information and the stored drawing object information.

Thus, the coordinate transformation information and the drawing object information are separately and independently prepared and the process of generating the three-dimensional image on the basis of these information is carried out all at once. Consequently, it is possible to improve a processing speed (i.e. a drawing speed) of generating the three-dimensional image. Namely, by separating the coordinate transformation information and the drawing object information, it is possible to avoid the limitation of the conventional data structure that the substitution of a single function, such as a library absorbing a general device dependence, cannot handle the function of the drawing device in this coordinate transformation because the coordinate transformation, which is an important element for drawing, operates as a state machine having a condition inside.

In particular, according to the image generating apparatus of the present invention, the drawing object information generating device generates, in advance, not only the drawing object information corresponding to the objects to be displayed in the image generating process that carried out now but also the drawing object information corresponding to other objects that expected to be displayed in the image generating process that carried out at a different time. Namely, the drawing object information generating device generates the drawing object information to be used for the image generating process at the present time and generates, in advance, the drawing object information expected to be used for the image generating process in the future. Then, the drawing object information storing device stores these generated drawing object information. Thereafter, if the time when said other objects need to be displayed has come, for example, when carrying out the next image generation process, the time after that or the like, the drawing object information generating device does not generate the drawing object information corresponding to said other objects. At this time, the drawing device generates the three-dimensional image representing said other objects by using the drawing object information stored in advance. Thus, it is possible to omit the generating of the drawing object information by using the drawing object information generated and stored in advance. Consequently, the speed of the whole of the image generating can be improved.

If the view point or the field of view continuously moves, the objects to be displayed as the three-dimensional image at the next time or the time after that can be expected. Therefore, if the drawing object information corresponding to said other objects is generated, the possibility of the use of that drawing object information is increased. As a result, it is possible to improve the speed of the image generating.

Incidentally, the drawing object information generating device may be constructed so as to generate the drawing object information in such a way that the drawing object information is divided into predetermined information units. For example, the predetermined information unit is defined on the basis of the unit of a display list. If the drawing object information is generated for each unit of the display list, the unit of the drawing object information matches the unit of the process of generating a three-dimensional image by applying the coordinate transformation information to the drawing object information in the drawing device. In addition, within the same predetermined information unit of the same display list or the like, the coordinate system is unified; however, it is not necessary to unify the coordinate system between the different predetermined information units.

In one aspect of the image generating apparatus of the present invention, said other objects are objects that exist in a peripheral region of a current field of view.

According to this aspect, if the view point or the field of view continuously moves, the possibility that the opportunity to display the objects existing in the peripheral region of the current field of view will come in the next time or the time after the next is high. Therefore, it is possible to increase the speed of the image generating. For example, if the image generating apparatus is applied to a navigation system, the continuously changing view (e.g. a landscape form a moving car) to be displayed as the three-dimensional image is reproduced smoothly.

In anther aspect of the image generating apparatus of the present invention, said other objects are objects that exist in a region located ahead of a current field of view located ahead of a view point of a viewer.

According to this aspect, when the view point or the field of view continuously moves ahead, the possibility that the opportunity to display the objects existing in the region located ahead of the current field of view located ahead of the view point of the viewer will come in the next time or the time after the next is high. Therefore, the speed of the image generating can be increased more.

In another aspect of the image generating apparatus of the present invention, the drawing object information generates the drawing object information corresponding to the objects that exist within a region broader than the current field of view.

According to this aspect, it is possible to generate the drawing object information corresponding to the objects existing in the peripheral region of the current field of view. Therefore, as mentioned above, it is possible to increase the speed of the image generating.

In another aspect of the image generating apparatus of the present invention, the image generating apparatus is further provided with a changing information supplying device for supplying changing information that indicates a change of at least one of the view point and the field of view, to the coordinate transformation information generating device. In this construction, the coordinate transformation information generating device generates the coordinate transformation information on the basis of the supplied changing information.

According to this aspect, the changing information supplying device generates the changing information on the basis of, for example, a mathematical formula and supplies it. Alternatively, the changing information supplying device may supply the changing information on the basis of current position information observed at a positioning apparatus mounted on a movable body. Then, the coordinate transformation information generating device generates the coordinate transformation information on the basis of the changing information. Therefore, it is possible to obtain the image sequentially changing according to the drive of the movable body or the image with the object or the like continuously changing by the time elapse.

In another aspect of the image generating apparatus of the present invention, the drawing device generates the three-dimension image whenever the coordinate transformation information generated by the coordinate transformation information generating device is changed.

According to this aspect, whenever the coordinate transformation information changes, i.e. when the movable body moves and its position changes, or when the coordinate information calculated by a predetermined operation changes, synchronized drawing is performed. Therefore, in accordance with the drive of the movable body, it is possible to generate the image and display while ensuring immediacy.

In another aspect of the image generating apparatus of the present invention, the drawing object information generating device includes a list generating device for generating a list of the drawing object information, and the list generating device generates, in advance, not only the list of the drawing object information corresponding to the objects to be displayed in the image generating process that carries out now but also the list of the drawing object information corresponding to said other objects to be displayed in the image generating process that carries out at a different time.

According to this aspect, the list generating device generates, in advance, not only the list of the drawing object information corresponding to the objects to be displayed in the image generating process that carried out now but also the list of the drawing object information corresponding to other objects that expected to be displayed in the image generating process that carried out at a different time. These generated list are stored with, for example, the drawing object information storing device. Thereafter, if the time when said other objects need to be displayed has come, the drawing device generates the three-dimensional image representing said other objects by using the list stored in advance. Thus, it is possible to omit the generating of the list by using the list generated in advance. Consequently, the speed of the whole of the image generating can be improved.

In another aspect of the image generating apparatus of the present invention, the image generating apparatus includes a drawing application processor and a graphics library. The graphics library is provided with: the drawing object information storing device; the coordinate transformation information storing device; and a controlling device for controlling the drawing device. The drawing application processor is provided with: the drawing object information generating device; the coordinate transformation information generating device; and an instructing device for instructing the controlling device to execute the generation of the three-dimensional image.

According to this aspect, both of the generating of the drawing object information and the generating of the coordinate transformation information are carried out in the drawing application processor (However, these two generating processes are separated in the drawing application processor.). Therefore, the graphics library and the drawing device can be separated from the drawing application processor. Consequently, it is possible to improve the ability of replacement. Moreover, since the single processor has the functions of generating the drawing object information and the coordinate transformation information and controls the graphics library and the drawing device, it becomes easy to generate the complex three-dimensional image. For example, the three-dimensional images drawn by changing the coordinate with respect to one drawing object can be easily generated by changing the coordinate transformation information while the drawing object information is fixed.

In another aspect on the image generating apparatus of the present invention, the drawing device is further provided with: a map information supplying device for supplying map information, which contains a source of the drawing object information, to the drawing object information generating device.

According to this aspect, a source of the drawing object information contained in the map information is supplied to the drawing object information generating device. Then, the drawing object information generating device generates the drawing object information on the basis of the source of the drawing object information contained in the map information. Moreover, for example, if the image generating apparatus is applied to a navigation system, position information of a movable body obtained from a GPS measurement apparatus or the like or route information inputted by the operator is used for the coordinate transformation. In this case, the coordinate transformation is carried out on the drawing object information by using the position information or route information. Thus, the three-dimensional image on the basis of map information can be generated. In addition, guidance information without the coordinate transformation can be displayed together with the three-dimensional image in the overlapping manner. By displaying of the images in an overlapping manner, an operator can easily understand the current position, a route to a destination or the like.

In another aspect of the image generating apparatus of the present invention, the drawing device generates the three-dimensional image with perspective.

According to this aspect, such a view that the operator can see from a driver's seat is displayed as the three-dimensional image in perspective, which allows the operator to easily recognize the image by corresponding it to the actual view.

In another aspect of the image generating apparatus of the present invention, the coordinate transformation information includes information for defining a light source.

According to this aspect, the drawing object information is transformed as the coordinate transformation information on the basis of light source information in addition to view point information and view field information, and it becomes possible to display the three-dimensional image more real. Especially, even if the light source indicated by the coordinate transformation information changes, if the three-dimensional image to be displayed after the change includes the same object as the one displayed before the change, the new three-dimensional image can be obtained by applying the new coordinate transformation information, on which the light source changes, on the same drawing object information associated with this same object. Moreover, even if the drawing device is replaced, the coordinate transformation information such as the view point information, the view field information and the light source information can be used as it is. Therefore, it is possible to replace the drawing device while keeping the quality of a three-dimensional image.

In another aspect of the image generating apparatus of the present invention, the information for defining the view point is set on the basis of a view point of a movable body operator.

According to this aspect, such a view that can be seen with the view point of the operator is displayed as the three-dimensional image, which allows the operator to easily recognize it as the image in three dimensions corresponding to the actual view. The view point may be set automatically or manually.

In another aspect of the image generating apparatus of the present invention, the information for defining the field of view is set on the basis of a field of view of a movable body operator.

According to this aspect, such a view in the field of view of the operator is displayed as the three-dimensional image. The field of view may be set automatically or manually.

In another aspect of the image generating apparatus of the present invention, the view point on the three-dimensional image is set so as to be located at a central portion of a display area of a display device.

According to this aspect, if the image generating apparatus is connected to a display device in order to display the generated three-dimensional image, the view point on the three-dimensional image is set so as to be located at the central portion of the display area of the display device. The drawing objects are displayed after the coordinate transformation so as to set the view point of the operator at the central portion of the display area.

In another aspect of the image generating apparatus of the present invention, the drawing device generates a plurality of partial frame images on the basis of the stored drawing object information, and superimposes the plurality of partial frame images.

According to this aspect, the drawing device generates the three-dimensional image of one frame by superimposing the plurality of partial frame images generated on the basis of the plurality of pieces of the drawing object information. Therefore, a more real three-dimensional image can be generated by the drawing device quickly.

In another aspect of the image generating apparatus of the present invention, the image generating apparatus is further provided with a frame buffer for storing the plurality of partial frame images.

According to this aspect, since the plurality of partial frame images are stored in the frame buffer, the three-dimensional image of one frame can be generated by simply superimposing the plurality of partial frame image stored in the frame buffer. Therefore, it is possible to generate the three-dimensional image easily. In addition, the frame buffer may be installed in a buffer memory of the drawing device.

In another aspect of the image generating apparatus of the present invention, the coordinate transformation information generating device generates a plurality of units of the coordinate transformation information, in which at least one of the view point and the field of view is different from each other, with respect to one unit of the drawing object information, and the image processing device generates the three-dimensional image which changes with time by applying the plurality of units of the coordinate transformation information to the one unit of the drawing object information.

According to this aspect, when generating the three-dimensional image which changes as time elapses, the coordinate transformation information is changed in the state that the drawing object information is fixed. Therefore, the processing load for drawing can be reduced and the three-dimensional images, which sequentially change, can be quickly generated. For example, it is possible to generate the three-dimensional image that sequentially changes according to a traveling of a movable body by sequentially changing the view point of the coordinate transformation information with respect to the same drawing object information. Also, if information defining a light source is included in the coordinate transformation information, it is possible to generate the three-dimensional image that sequentially changes as time elapses by sequentially changing the light source of the coordinate transformation information.

In another aspect of the image generating apparatus of the present invention, a process of generating the drawing object information in the drawing object information generating device, a process of generating the coordinate transformation information in the coordinate transformation information generating device, a process of storing the drawing object information in the drawing object information storing device and a process of storing the coordinate transformation information in the coordinate transformation information storing device are carried out with multitasking.

According to this aspect, the drawing object information and the coordinate transformation information are generated and stored by multitasking, so that it becomes possible to generate the three-dimensional image more quickly as a whole.

In another aspect of the image generating apparatus of the present invention, the image generating apparatus is further provided with a display device for displaying the images generated by the drawing device.

According to this aspect, it is possible to realize various electronic equipment such as a navigation system, such as an on-vehicle navigation system capable of displaying the multiple-layer 3D image or the like; a game apparatus, such as an arcade game, a television game, or the like; a computer, such as a personal computer capable of displaying the multiple-layer 3D image or the like; and so on.

The above object of the present invention can be achieved by a program storage device readable by a computer for tangibly embodying a program of instructions executable by the computer to perform an image generating method of drawing a three-dimensional image. The image generating method is provided with: a drawing object information generating process of generating drawing object information, which is information for drawing objects as the three-dimensional image, in a single coordinate system; a coordinate transformation information generating process of generating coordinate transformation information, which is information for defining at least one of a view point and a field of view concerning the three-dimensional image; a drawing object information storing process of storing the drawing object information; a coordinate transformation information storing process of storing the coordinate transformation information; and a drawing process of carrying out an image generating process of generating the three-dimensional image by using the stored drawing object information and the stored coordinate transformation information. In this method: in the drawing object information generating process, not only the drawing object information corresponding to the objects to be displayed in the image generating process that carries out now but also the drawing object information corresponding to other objects to be displayed in the image generating process that carries out at a different time is generated in advance; in the drawing object information storing process, the generated drawing object information corresponding to said other objects is stored; and in the drawing process, the three-dimensional image corresponding to said other objects is generated by using the drawing object information corresponding to said other objects stored in advance.

According to the program storage device, the integrated control of the above described image generating apparatus of the present invention can be relatively easily realized as a computer reads and executes the program of instructions from the program storage device such as a CD-ROM (Compact Disc—Read Only Memory), a DVD-ROM (DVD Read Only Memory), a hard disc or the like, or as it executes the program of instructions after downloading the program through communication device.

The above object of the present invention can be achieved by a computer data signal embodied in a carrier wave and representing a series of instructions which cause a computer to perform an image generating method of drawing a three-dimensional image. The image generating method is provided with: a drawing object information generating process of generating drawing object information, which is information for drawing objects as the three-dimensional image, in a single coordinate system; a coordinate transformation information generating process of generating coordinate transformation information, which is information for defining at least one of a view point and a field of view concerning the three-dimensional image; a drawing object information storing process of storing the drawing object information; a coordinate transformation information storing process of storing the coordinate transformation information; and a drawing process of carrying out an image generating process of generating the three-dimensional image by using the stored drawing object information and the stored coordinate transformation information. In this method: in the drawing object information generating process, not only the drawing object information corresponding to the objects to be displayed in the image generating process that carries out now but also the drawing object information corresponding to other objects to be displayed in the image generating process that carries out at a different time is generated in advance; in the drawing object information storing process, the generated drawing object information corresponding to said other objects is stored; and in the drawing process, the three-dimensional image corresponding to said other objects is generated by using the drawing object information corresponding to said other objects stored in advance.

According to the computer data signal embodied in the carrier wave of the present invention, as the computer downloads the program in the computer data signal through a computer network or the like, and executes this program, it is possible to realize the integrated control of the above described image generating apparatus of the present invention.

The above object of the present invention can be achieved by an image generating method of drawing a three-dimensional image, provided with: a drawing object information generating process of generating drawing object information, which is information for drawing objects as the three-dimensional image, in a single coordinate system; a coordinate transformation information generating process of generating coordinate transformation information, which is information for defining at least one of a view point and a field of view concerning the three-dimensional image; a drawing object information storing process of storing the drawing object information; a coordinate transformation information storing process of storing the coordinate transformation information; and a drawing process of carrying out an image generating process of generating the three-dimensional image by using the stored drawing object information and the stored coordinate transformation information. In this method: in the drawing object information generating process, not only the drawing object information corresponding to the objects to be displayed in the image generating process that carries out now but also the drawing object information corresponding to other objects to be displayed in the image generating process that carries out at a different time is generated in advance; in the drawing object information storing process, the generated drawing object information corresponding to said other objects is stored; and in the drawing process, the three-dimensional image corresponding to said other objects is generated by using the drawing object information corresponding to said other objects stored in advance.

According to the image generating method of the present invention, the drawing object information and the coordinate transformation information concerning the objects to be drawn as the three-dimensional image are separately generated. Furthermore, the drawing object information and the coordinate transformation information are separately stored and managed. Then, the three-dimensional image is generated by using the drawing object information and the coordinate transformation information. Thus, the drawing object information and the coordinate transformation information are separately and independently prepared and the process of generating the three-dimensional image on the basis of these information is carried out all at once. Consequently, it is possible to improve a processing speed (i.e. a drawing speed) of generating of the images. In particular, according to the image generating method of the present invention, not only the drawing object information corresponding to the objects to be displayed in the image generating process that carried out now but also the drawing object information corresponding to other objects that expected to be displayed in the image generating process that carried out at a different time is generated in advance. Then, these generated drawing object information are stored. Thereafter, if the time when said other objects need to be displayed has come, the three-dimensional image representing said other objects is generated by using the drawing object information stored in advance. Thus, it is possible to omit the generating of the drawing object information by using the drawing object information generated and stored in advance. Consequently, the speed of the whole of the image generating can be improved.

In one aspect of the image generating method of the present invention, sand other objects are objects that exist in a peripheral region of a current field of view.

According to this aspect, if the view point or the field of view continuously moves, the possibility that the opportunity to display the objects existing in the peripheral region of the current field of view will come in the next time or the time after that is high. Therefore, it is possible to increase the speed of the image generating.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENT

The preferred embodiments according to an image generating apparatus and an image generating method and a computer program in the present invention will be explained below with reference to the drawings. By the way, the respective embodiments described below are established as the apparatus in which the image generating apparatus of the present invention is used as a navigation system for a car. However, they are not limited to it. The present invention can be preferably applied to an image generation using a personal computer, an image generation for a television game and the like.

(First Embodiment)

Figure 2:
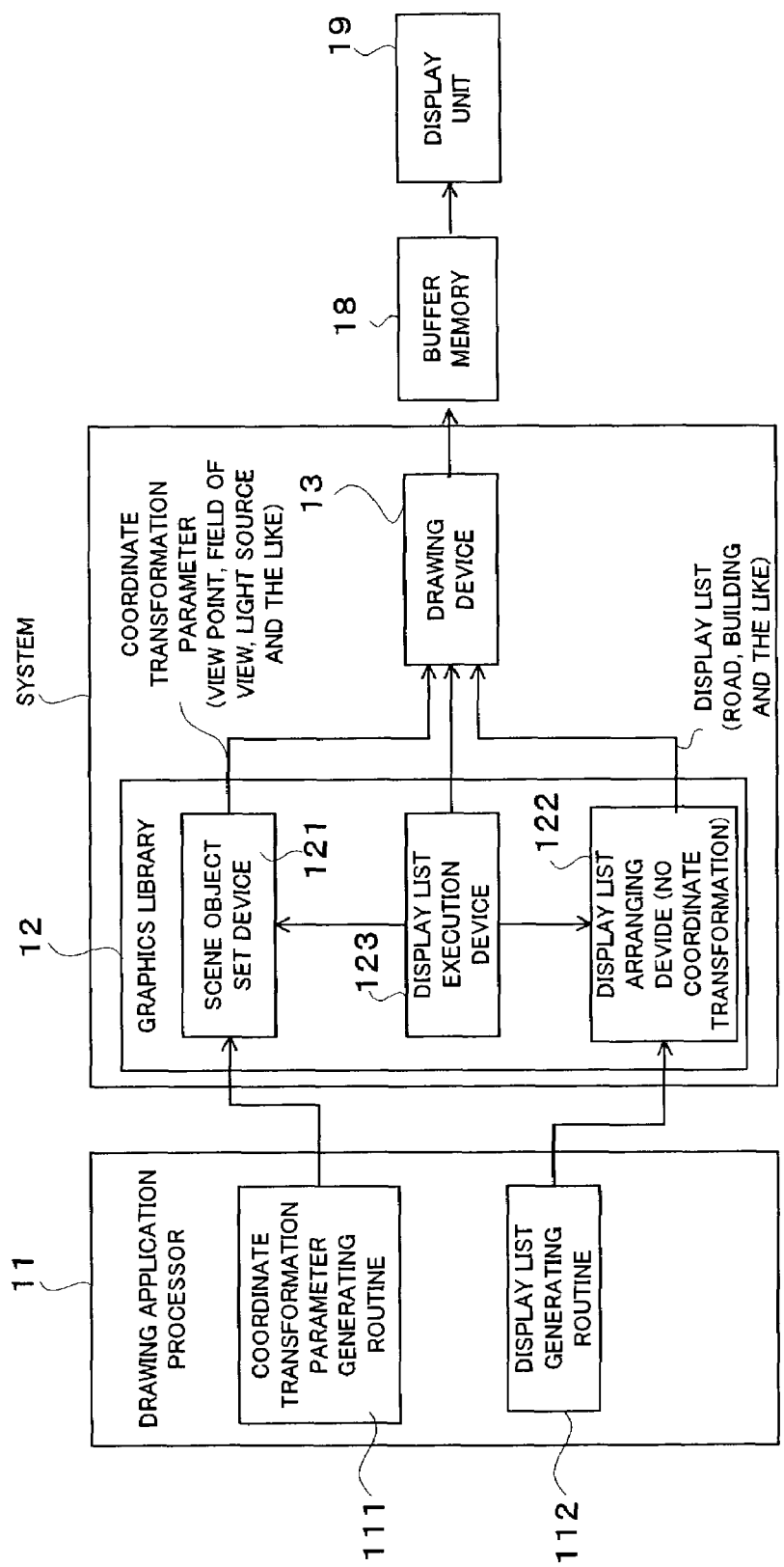
FIG. 2 is a view illustrating an inner configuration of a graphics library of an image generating apparatus.
Figure 3:
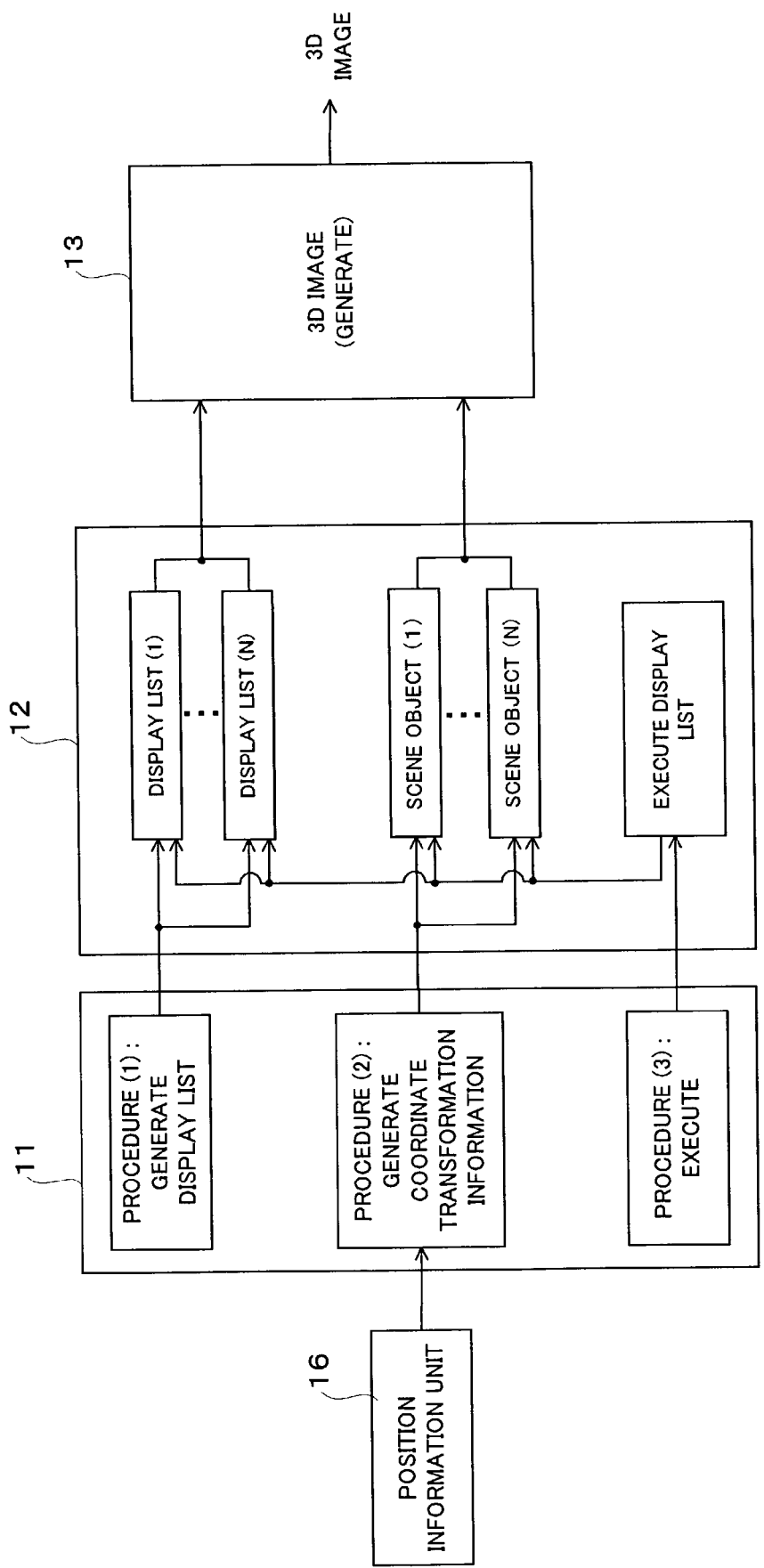
FIG. 3 is a view illustrating a management of a scene object of an image generating apparatus.
Figure 4:
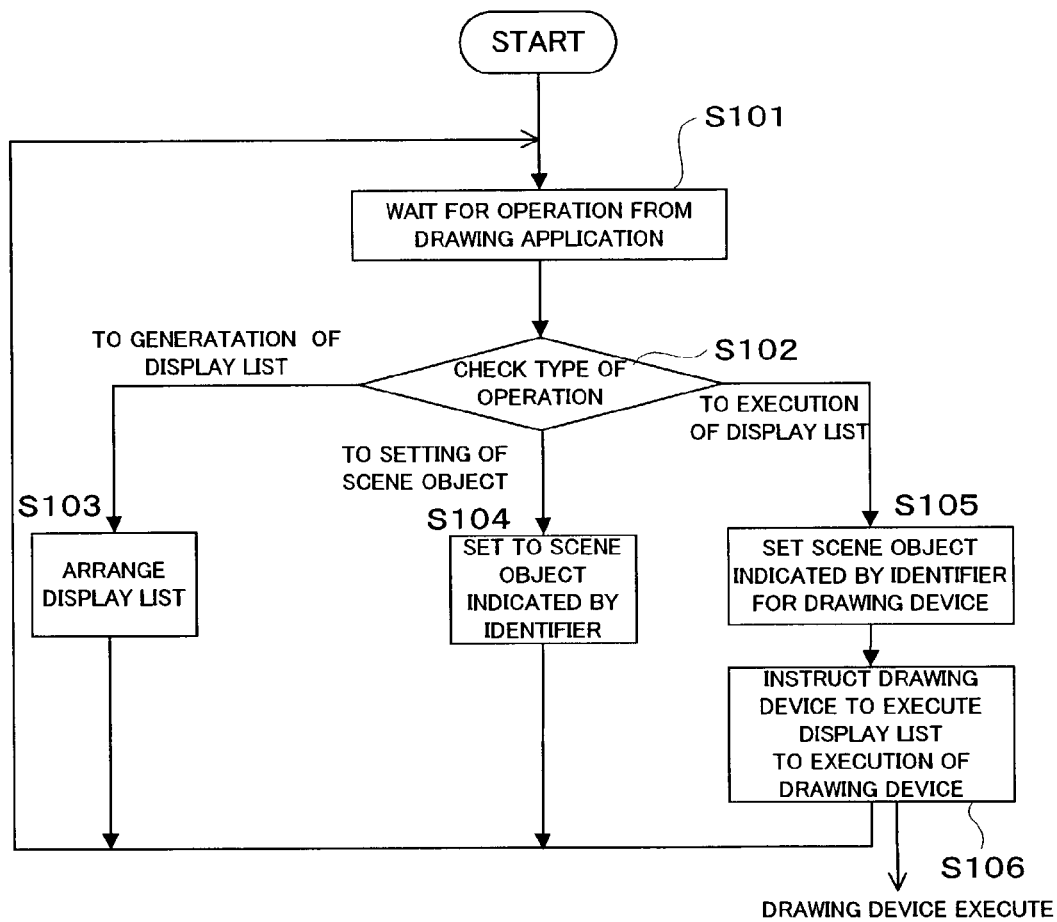
FIG. 4 is a flowchart showing a flow of an operation of a graphics library.
Figure 5:
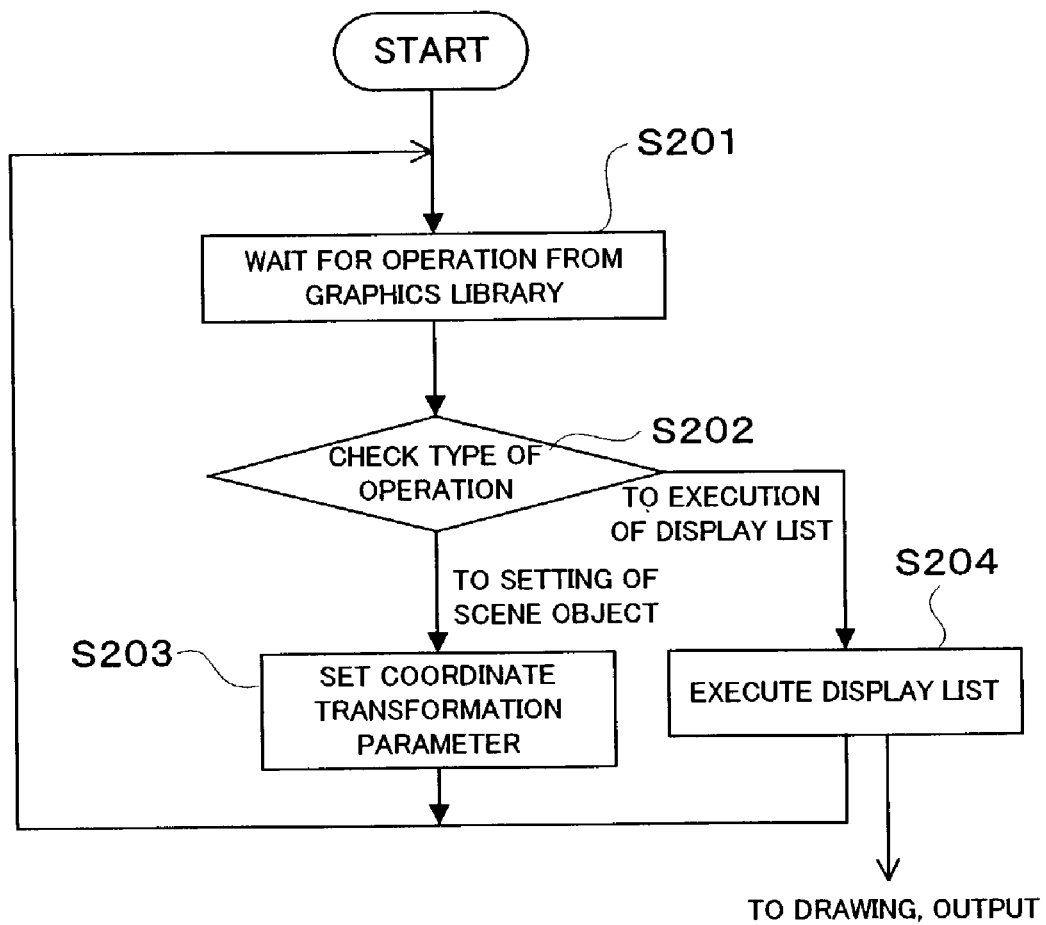
FIG. 5 is a flowchart showing a flow of an operation of a drawing device of an image generating apparatus.
Figure 6:
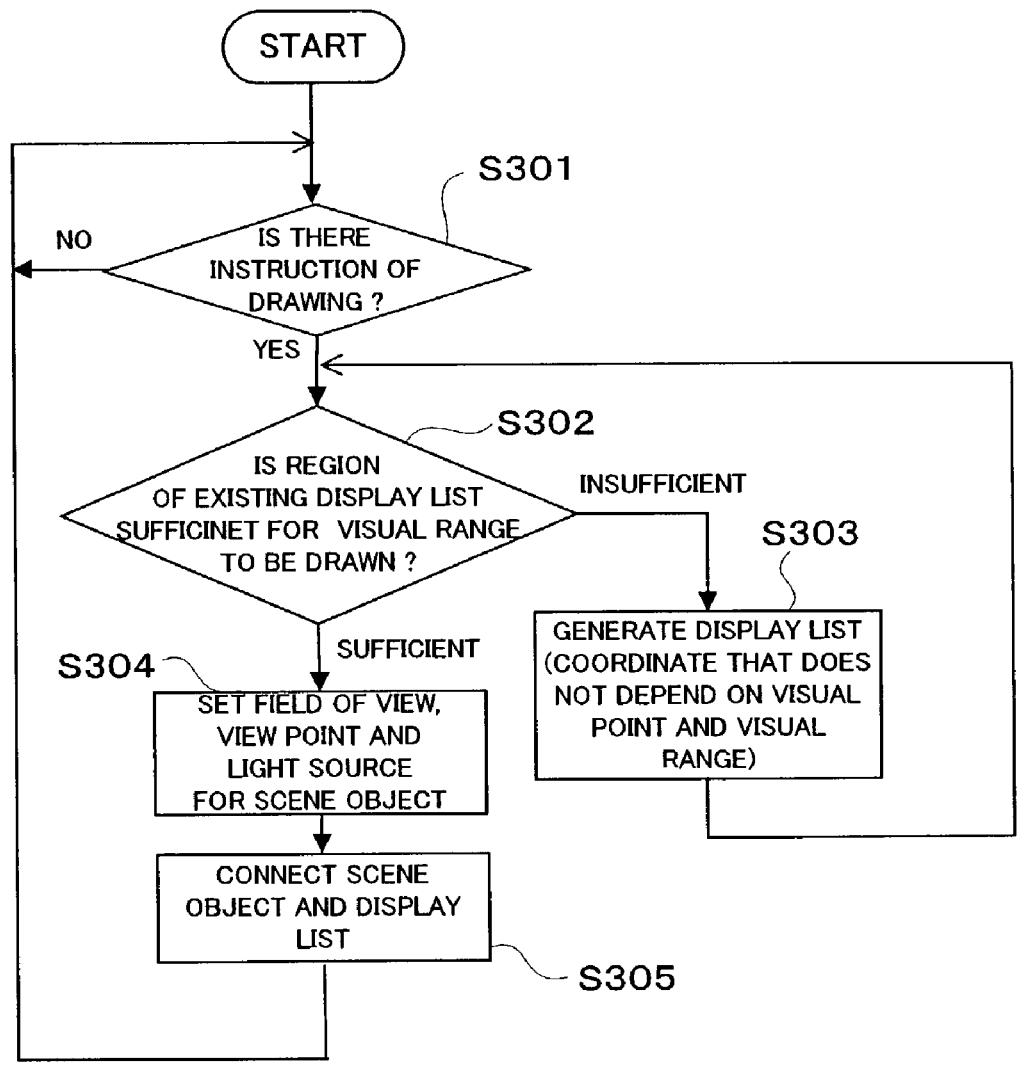
FIG. 6 is a flowchart showing an operation of a drawing application processor of an image generating apparatus.
Figure 7:
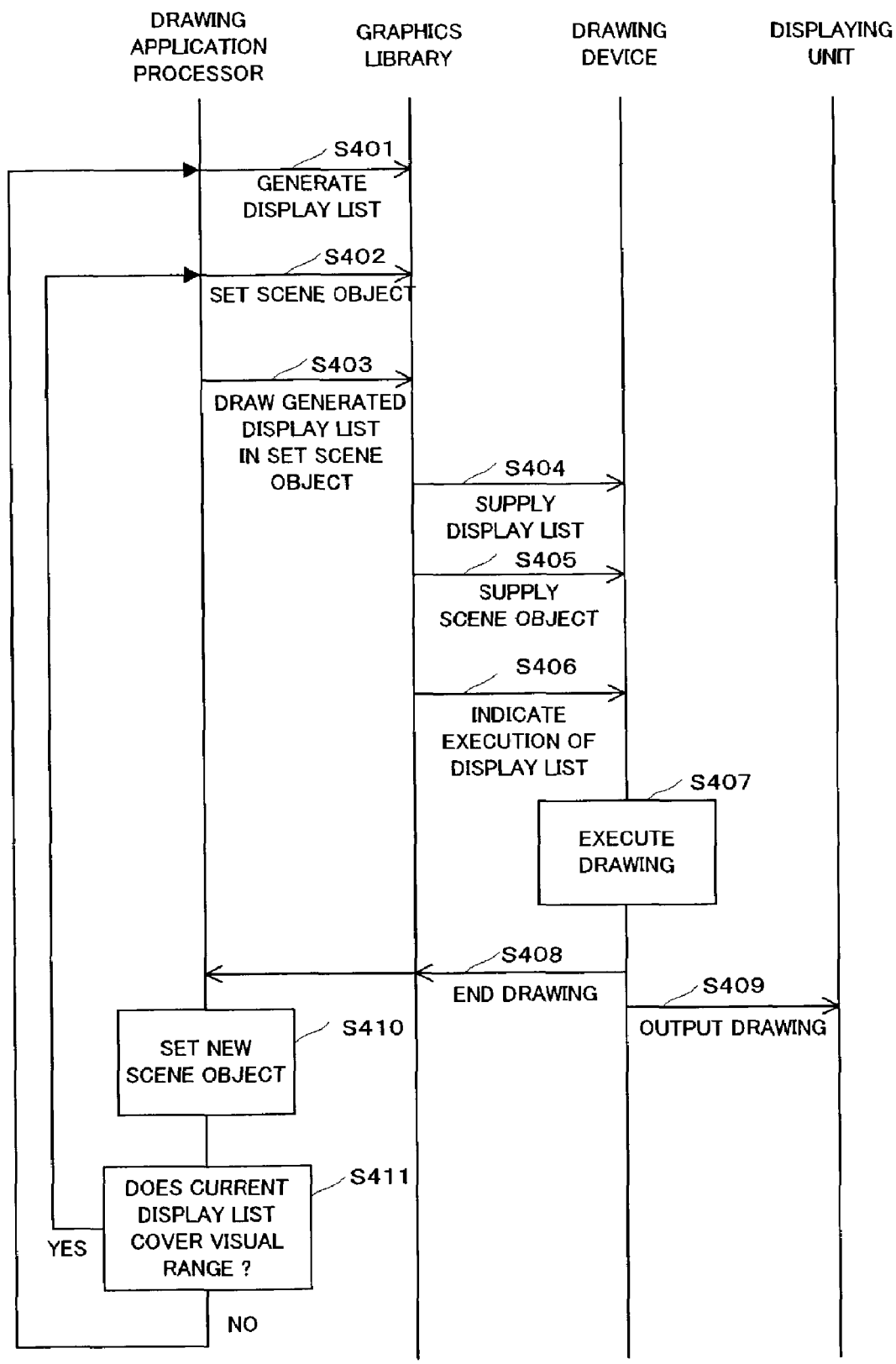
FIG. 7 is a sequence chart showing an operation of an image generating apparatus.
Figure 8:
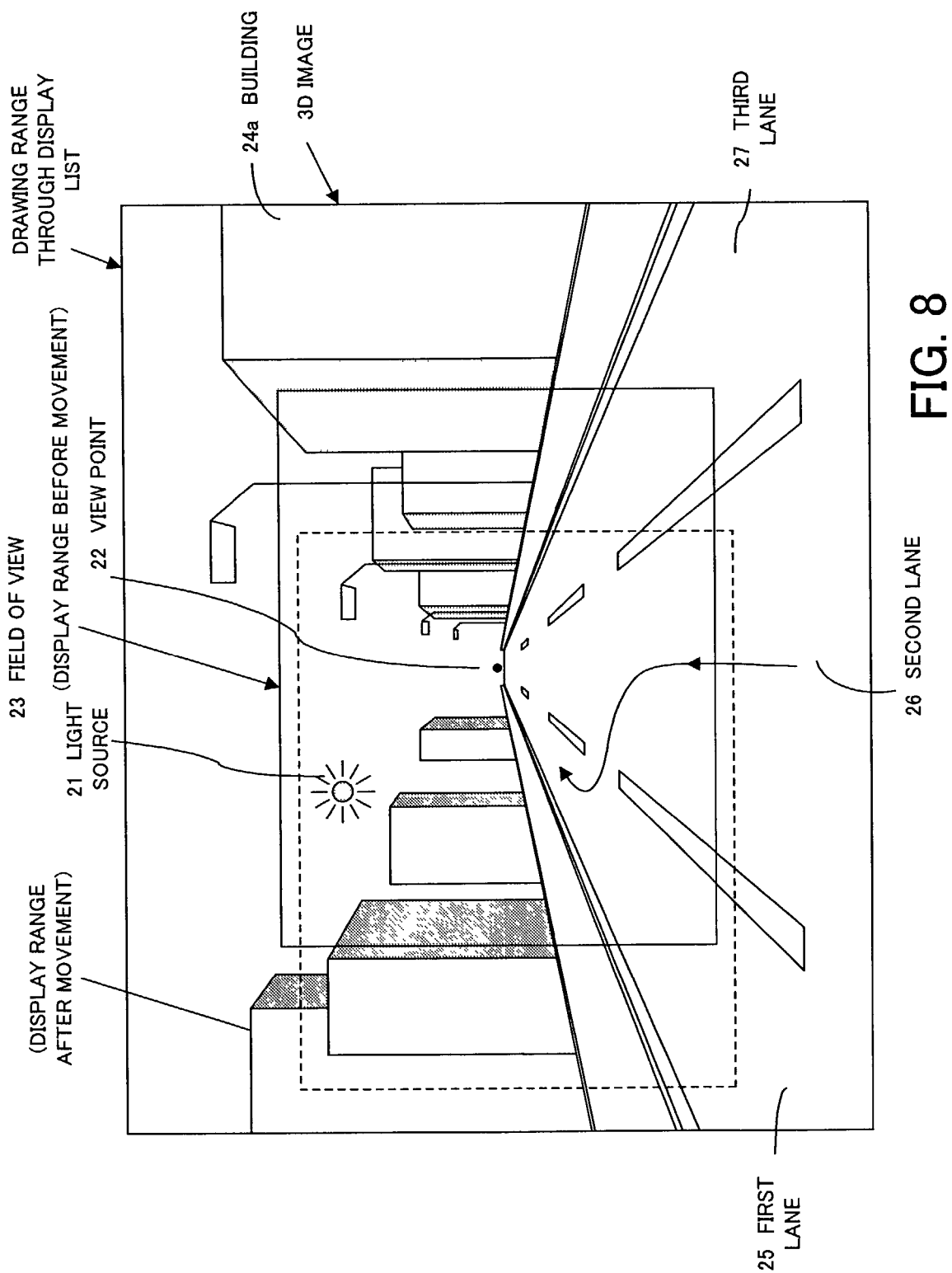
FIG. 8 is a view showing an example of a drawing.
Figure 9A:
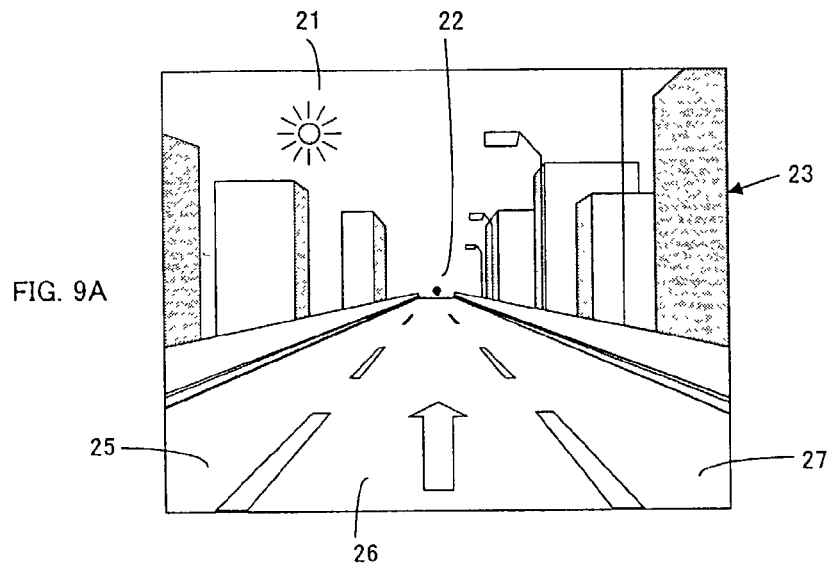
FIGS. 9A, 9B and 9C are views showing an example of a drawing.
Figure 9B:
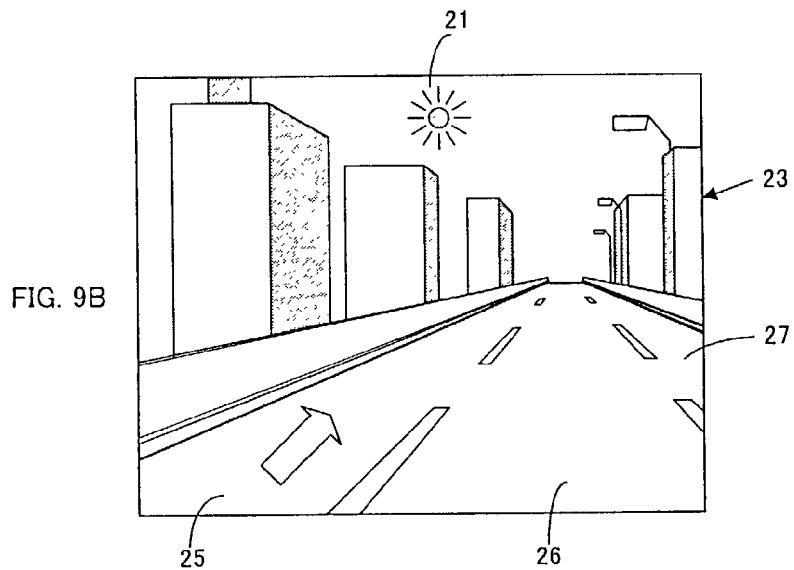
Figure 9C:
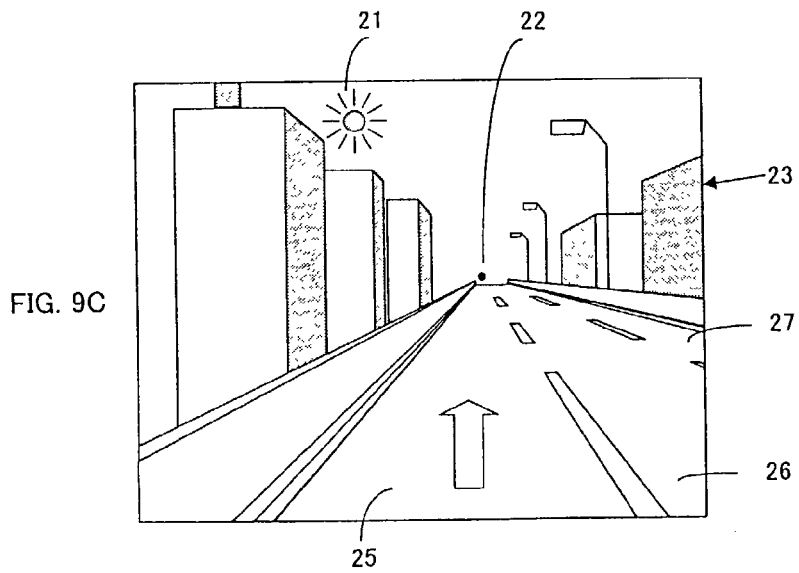

An image generating apparatus in the first embodiment will be described below with reference to FIG. 1 to FIG. 9. Here, FIG. 1 is a block diagram showing a basic configuration of an image generating apparatus, which is a first embodiment of the present invention, FIG. 2 is a view illustrating an inner configuration of a graphics library of an image generating apparatus, FIG. 3 is a view illustrating a management of a scene object of an image generating apparatus, FIG. 4 is a flowchart showing a flow of an operation of a graphics library, FIG. 5 is a flowchart showing a flow of an operation of a drawing device of an image generating apparatus, FIG. 6 is a flowchart showing an operation of a drawing application processor of an image generating apparatus, FIG. 7 is a sequence chart showing an operation of an image generating apparatus, FIG. 8 is a view showing an example of a drawing, and FIGS. 9A, 9B and 9C are views showing an example of a drawing.

At first, the basic configuration of the image generating apparatus in this embodiment is described with reference to FIG. 1.

Figure 1:
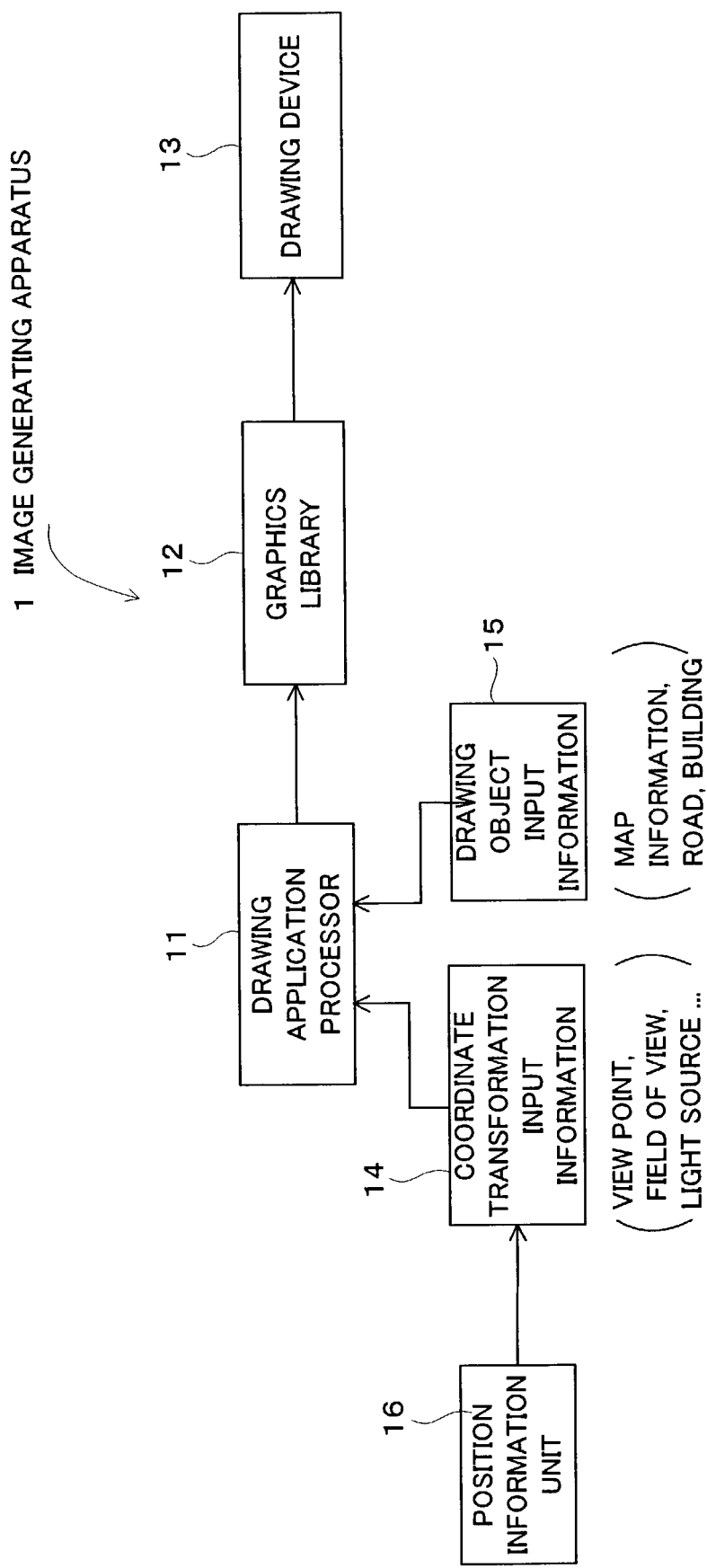
FIG. 1 is a block diagram showing a basic configuration of an image generating apparatus, which is a first embodiment of the present invention.

In FIG. 1, the image generating apparatus 1 is provided with a drawing application processor 11, a graphics library 12 and a drawing device 13. Coordinate transformation input information 14 and drawing object input information 15 are inputted to the drawing application processor 11. The coordinate transformation input information 14 is used as sources of the coordinate transformation information. The coordinate transformation information includes information for defining a view point, a field of view, a light source and the like. The coordinate transformation information includes coordinate information (it serves as changing information) supplied from a position information unit 16 or the like. The coordinate information is also used as sources of the coordinate transformation information similarly to other components of the coordinate transformation input information. Namely, the coordinate transformation information is sequentially generated by the coordinate information. The position information unit 16 serves as a changing information supplying device. The position information unit 16 is, for example, a position measuring apparatus applied to a mobile body, a program, a calculating apparatus, a manual input apparatus and so on.

If the position information unit 16 is the position measuring apparatus, the coordinate information is the information indicating the position of the mobile body which is supplied at predetermined intervals in time or at predetermined intervals in distance while the mobile body is moving. If the position information unit 16 is configured a program, the coordinate information is the information supplied by a sequence defined by the program. If the position information unit 16 is the calculating apparatus, the coordinate information is the values of the coordinate corresponding to a results obtained by inputting parameters into a function representing a state. If the position information unit 16 is the manual input apparatus, the coordinate information is the values of the coordinate manually inputted by an operator while considering various conditions. On the other hand, the drawing object input information 15 is used as sources of the drawing object information. The drawing object information includes information of a road, a building, a map and the like.

The graphics library 12 and the drawing device 13 constitute a system integrally with each other, and arbitrarily replaced for the drawing application processor 11, as described below. This contributes improvement of the ability of replacement.

As shown in FIG. 2, the drawing application processor 11 has a coordinate transformation parameter generating routine 111 and a display list generating routine 112. The coordinate transformation parameter generating routine 111 generates the coordinate transformation information (a coordinate transformation parameters) containing the information of a view point, a field of view, a light source and the like on the basis of the coordinate transformation input information 14. The coordinate transformation information (the coordinate transformation parameters) is managed as a scene object by the graphics library 12. Moreover, an identifier is set on the scene object. The operations for setting the coordinate transformation parameters for the scene object and applying the set coordinate transformation parameters to the drawing process are executed by identifying the identifier.

The display list generating routine 112 generates the drawing object information containing the information of a road, a building, a map and the like on the basis of the drawing object input information 15. Then, the display list generating routine 112 generates a display list by using the drawing object information. Then, the display list generating routine 112 supplies the display list to the graphics library 12. The drawing object information does not include the coordinate transformation information or the coordinate transformation parameters. Also, the display list does not include the coordinate transformation information or the coordinate transformation parameters. The coordinate transformation information (the coordinate transformation parameters) is separately generated and set as the scene object. In this way, the drawing object information (the display list) and the coordinate transformation information (the coordinate transformation parameters) are separately and independently generated and managed, and the 3D image is generated by applying the coordinate transformation information to the drawing object information at the time of the execution of the image generating process. This attains the replacement of the system as mentioned above and the higher speed of the drawing speed.

Next, the graphics library 12 has a scene object setting device 121, a display list arranging device 122 and a display list execution device 123.

The scene object setting device 121 stores the coordinate transformation information (the coordinate transformation parameters) generated by the coordinate transformation parameter generating routine 111 of the drawing application processor 11, and manages it. The coordinate transformation information (the coordinate transformation parameters) is stored in the scene object corresponding to the identifier set by the drawing application processor 11. The display list arranging device 122 arranges or reconstructs the display list generated by the display list generating routine 112 of the drawing application processor 11. In the display list arranging device 122, the display list is arranged or reconstructed so as to be suitable for the drawing device 13. Thus, the drawing device 13 can directly execute the image generating process at a time by using the arranged or reconstructed display list. Therefore, the speed of the image generating process can be increased.

The display list execution device 123 controls the drawing device 13. When generating the 3D image, the display list execution device 123 instructs the scene object setting device 121 and the display list arranging device 122 to send the coordinate transformation information and the arrange or reconstructed display list to the drawing device 13, and further instructs the drawing device 13 to execute the image generating process.

In this graphics library 12, the coordinate transformation information (the coordinate transformation parameters) and the drawing object information (display list) are separated and stored. Then, at the time of the image generating process, the drawing device 13 applies the coordinate transformation information to the drawing object information, and carries out the coordinate transformation by adding the conditions of the view point, the field of view, the light source and the like, which are set as the scene object, and generates the 3D images. The drawing object information included in a single display list is formed on a single coordinate system that does not depend on the view point and the field of view.

The image generated by the drawing device 13 is held in a buffer memory 16 and supplied to the display unit 17. Thus, the image is displayed by the display unit 17.

The procedure for generating the 3D image will be described below with reference to FIG. 3. At first, the drawing application processor 11 generates a display list (Procedure (1)). The generated display list is stored as an object display list (1) of the graphics library 12. Next, the drawing application processor 11 generates coordinate transformation information (coordinate transformation parameters) (Procedure (2)). The coordinate transformation information (the coordinate transformation parameters) is stored in a scene object (1). At this time, an identifier is set on the scene object (1). Next, the drawing application processor 11 instructs the graphics library 12 to execute the image generating process (Procedure (3)). In response to this, the graphics library 12 accesses the display list (1) and the scene object (1), sends the drawing object information of the display list (1) and the coordinate transformation information of the scene object (1) to the drawing device 13, and instructs the drawing device 13 to execute the image generating process. In response to this, the drawing device 13 executes the image generating process, thereby generating the 3D image. Incidentally, the setting of the identifier is carried out on the basis of the coordinate information supplied from the position information unit 16.

The drawing device 13 has the coordinate transformation function. On the basis of the coordinate transformation parameters indicated by the identifier, for example, on the basis of a view point and a field of view of a driver, a light source, and the like if a car is driving, a drawing object information, for example, a current view during the driving that is watched by the driver is generated and displayed in the 3D image. At this time, many object display lists or scene objects can be generated and stored in advance, and any one of or some display lists and any one of or some scene objects can be combined.

The flow of the operation of the graphics library 12 will be described below with reference to FIG. 4.

At first, from a waiting state for an operation input from the drawing application processor 11 (Step S101), if there is the operation input, a type of the operation is checked (Step S102). The types of the operation in the graphics library 12 are the arranging or reconstructing of the display list, the setting of the scene object and the execution of the display list.

If the arranging or reconstructing of the display list is indicated, the display list received from the drawing application processor 11 is arranged or reconstructed so as to be suitable for the drawing device 13 (Step S103). After the arranging or reconstructing of the display list, the operational flow returns back to the step S101, and waits for a next operation input.

As the checked result at the step S102, if the operation input is the setting of the scene object, the coordinate transformation information received from the drawing application processor 11 is set to the scene object indicated by the identifier (Step S104). When the setting of the scene object is completed, the operational flow again returns back to the step S101 and waits for a next operation input.

As the checked result at the step S102, if the operation input is the execution of the display list, the scene object indicated by the identifier is set for the drawing device 13 (Step S105). Then, the graphics library 12 instructs the drawing device 13 to execute the display list (i.e. to execute the image generating process) (Step S106).

After that, the operational flow returns back to the step S101 and waits for a next operation input. The drawing device 13 executes the display lists at a time, and generates the image. The executing procedure is based on the executing procedures described with reference to FIG. 3.

The flow of the operation of the drawing device 13 will be described below with reference to FIG. 5.

At first, from a waiting state for an operation input from the graphics library 12 (Step S201), if there is the operation input, a type of the operation is checked (Step S202). As the types of the operation, there are the setting of the scene object and the execution of the display list.

If the setting of the scene object is indicated, the drawing device 13 sets the coordinate transformation parameters corresponding to the scene object indicated by the identifier (Step S203). After the completion of the setting of the coordinate transformation parameters, the operational flow again returns back to the step S201 and waits for a next operation input.

As the checked result at the step S202, if the operation input is the execution of the display list, the image generating process is executed on the basis of the coordinate transformation parameters and the display list. The generated image is outputted from the drawing device 13.

The flow with regard to the operation of the drawing application processor 11 will be described below with reference to FIG. 6. This is the case when a region wider than the region actually displayed on the display unit (corresponding to the field of view) is treated as the drawing object information.

At first, if there is a drawing request (Step S301), the drawing application processor 11 determines whether or not the region of the display list corresponding to the already-generated drawing object information sufficiently contains the field of view to be drawn (Step S302). That is, the drawing application processor 11 determines whether or not the drawing object information existing now is satisfied the information of the current field of view to be executed at this time which is indicated by the identifier.

If the drawing object information is insufficient, the display list is generated (Step S303). Namely, the drawing object information within the range to satisfy the information of the view point and the field of view is extracted, and converted into the display list. Then, the operational flow returns back to the step S202.

If it is satisfied at the step S302, the coordinate transformation information of the view point, the field of view and the light source is set for the scene object (Step S304). Next, the display list and the coordinate transformation information are connected to each other, and the instruction to draw the image is issued (Step S305). After that, the operational flow returns back to the step S101, and wait for a next drawing request.

As mentioned above, at the step S302, if the region of the display list is sufficient for the field of view to be drawn, the display list that already exists can be used. Thus, the process for generating the display list, which requires a time, can be omitted. That is, a desirable image can be drawn by applying a new scene object to the display list that already exists. Hence, it is possible to attain the drawing operation at the extremely high speed.

Also, at the step S303, when the display list is generated, the display list is generated not only for objects contained in the image to be drawn at this time, but also for objects containing those existing in a region wider than the region of the field of view corresponding to the image. Thus, the possibility that it is determined to be sufficient at the step S302 can be raised when the drawing is requested at the next time, the time after the next and the like. Then, if it is sufficient at the step S302, by applying the new scene object to the display list, the drawing can be done at the high speed. Also, under a multi-task environment, the generation of the display list is done at a different task, and the generation range is calculated from expectation, and it is speculatively generated. Hence, the drawing operation can be attained at the further high speed.

Next, the operation of the image generating apparatus will be described below along a temporal flow with reference to a sequence chart of FIG. 7. This sequence chart temporally shows the mutual relation between the drawing application processor 11, the graphics library 12, the drawing device 13 and the display unit 19. The lateral line represents the mutual relation, and the longitudinal line represents the elapse of the time from the top towards the bottom.

At first, the drawing application processor 11 generates a display list, and inputs it to the graphics library 12 (Step S401). Next, the drawing application processor 11 generates coordinate transformation parameters, sets an identifier, and instructs the graphics library 12 to set a scene object (Step S402). Next, the drawing application processor 11 instructs the graphics library 12 to apply the set scene object to the generated display list and generate the image (Step S403).

If there is this indication, the graphics library 12 supplies the display list to the drawing device 13 (Step S404), and supplies the scene object (Step S405) to the drawing device 13, and then instructs the drawing device 13 to execute the display list (Step S406).

The drawing device 13, when receiving this indication, executes the display list in accordance with the coordinate transformation parameters of the scene object (Step S407). When the execution of the image generating is ended, the drawing device 13 reports the completion of the drawing to the graphics library 12 and the drawing application processor 11 (Step S408). Then, it carries out the process for ending the drawing operation, and outputs the drawing image to a displaying unit 19 and displays it thereon (Step S409).

When receiving the report of the completion of the drawing, the drawing application processor 11 sets a next identifier (Step S410). Next, it determines whether or not the field of view of the next identifier can be covered by the current display list (Step S411). If it can be covered, the display list can be used. Then, the operational flow returns back to the step S402, and a new drawing process starts with the setting of a scene object.

On the other hand, if it is determined to be not covered, the generation of a new display list is needed. Then, the operational flow returns back to the step S401, and a new drawing process starts with the generation of a display list.

FIG. 8 is an example of the displaying of the multiple-layer 3D image generated as mentioned above. It illustrates a view watched from a sight line of a driver when a car is driving on a road in a town. In FIG. 8, a light source 21, a view point 22, a field of view 23 and the like imply the coordinate transformation information represented by the identifier set in the scene object, and buildings 24a, 24b, 24c, . . . and a first lane 25, a second lane 26, a third lane 27, and the like, of a road correspond to the drawing object information. For example, the light source 21 is the sun in the daytime, and it is a streetlight in the night. Their positions are the parameters. Also, the point corresponding to the sight line of the driver can be used as the view point. It can be watched at the feeling similar to that of the view of the environment in which the car is driving. The field of view 23 defines a predetermined image range. It is given to the driver, and the suitable range is set.

Also, the buildings 24a, 24b, 24c, . . . and the like correspond to the drawing object information. The display list in relation to them is generated in the format that can be directly executed by the drawing device. The drawing object information can be used from those supplied through a map information database of the navigation system and the like. Also, the format as the drawing object information is represented in the single coordinate system that does not contain the coordinate transformation information.

In FIG. 8, in accordance with the information of the scene object, the light source 21, namely, the sun is forwardly located, and the side of the buildings 24a, 24b, 24c, . . . facing the driver is darkly shaded. Also, the view point 22 is located over the second lane 26. Then, the coordinate transformation is done such that the drawing objects, such as the buildings 24a, 24b, 24c, . . . and the first lane 25 to the third lane 27 and the like which are within the range set by the field of view 23, are converged to this view point 22, by using the method based on the perspective. Because of this, the 3D image can be obtained.

Here, the drawing range through the display list is generated for the drawing objects in a range wider than the region represented by the field of view 23, namely, an actually displayed region. The actual display range is clipped from the drawing range. If the range to be clipped is within the drawing range through the display list, the same display list can be used even in the case when the drawing operation is done with regard to the moved view point.

However, the 3D image coincident with the position of the view point can not be obtained by simply clipping only the region corresponding to the field of view. That is, the image expected to be changed on the basis of the movement of the view point can not be displayed by only storing the image information in the region wider than the display region in a larger frame buffer and instantly display the image at the time of the movement in the display region within the range, such as the above-mentioned conventional simple 2D image displaying technique. FIGS. 9B and 9C show an example of an inappropriate situation and an example of an appropriate situation with regard to the display range.

At first, FIG. 9A is a 3D image when a driver is driving on the second lane 26 and the view point 22 is located over the second lane 26. This image corresponds to the portion surrounded with a solid line in the center of FIG. 8. Next, let us suppose that the driver changes the lane and moves to the first lane 25. Then, if the portion surrounded with a dashed line of FIG. 8 is clipped, this results in an image which does not coincide with a view point of the driver, as shown in FIG. 9B. FIG. 9C shows a 3D image obtained by the new identifier to the existing display list as mentioned above. In this 3D image, the view point 22 is set at the center of the screen, that is, over the first lane 25.

Also, a chimney 28, which is not watched because of an existence of a building since it is positioned behind the building in FIG. 9A, is drawn in FIG. 9C. In this embodiment, in particular, the display list for the chimney 28 is generated in advance when the drawing of FIG. 9A is carried out. Thus, it is possible to rapidly switch from FIG. 9A to FIG. 9C.

By the way, the drawing operations before and after the change of the lane are described in FIGS. 9A to 9C. However, on the basis of the change in the view point caused by the simple continuation of the driving on the same lane, even if a building and the like that are not drawn since they are located at a faraway location or behind a different building and the like are newly drawn, by similarly generating the display list, it can be rapidly draw.

By the way, as the position of the car that is used as the coordinate transformation information, positional information can be used which is measured by a GPS measuring apparatus or a self-contained measuring apparatus. Also, the generation of the display list that requires a long time can be omitted. Thus, this is suitable for the generation of the image for an operator of a mobile body whose position is quickly changed to watch.

As mentioned above in detail, the drawing object information and the coordinate transformation information are treated while separated from each other. Also, the display list is commonly used within the predetermined range. Moreover, the display list unnecessary for the current drawing operation is generated in advance for the next time, the time after the next and the like. It is possible to attain the image generating apparatus that can carry out the high speed drawing operation of the 3D image.

(Second Embodiment)

The above-mentioned image generating apparatus will be described below by exemplifying the case when this apparatus is applied to a navigation system for a mobile body. The various functions of the navigation system are closely related to the image generating apparatus. Therefore, the image generating apparatus are installed in the navigation system integrally. This point is described in detail. Incidentally, the configuration and the operations of the image generating apparatus itself are similar to those as mentioned above. Then, the re-explanation is omitted. The above-mentioned explanation is suitably seen as necessary.

Figure 10:
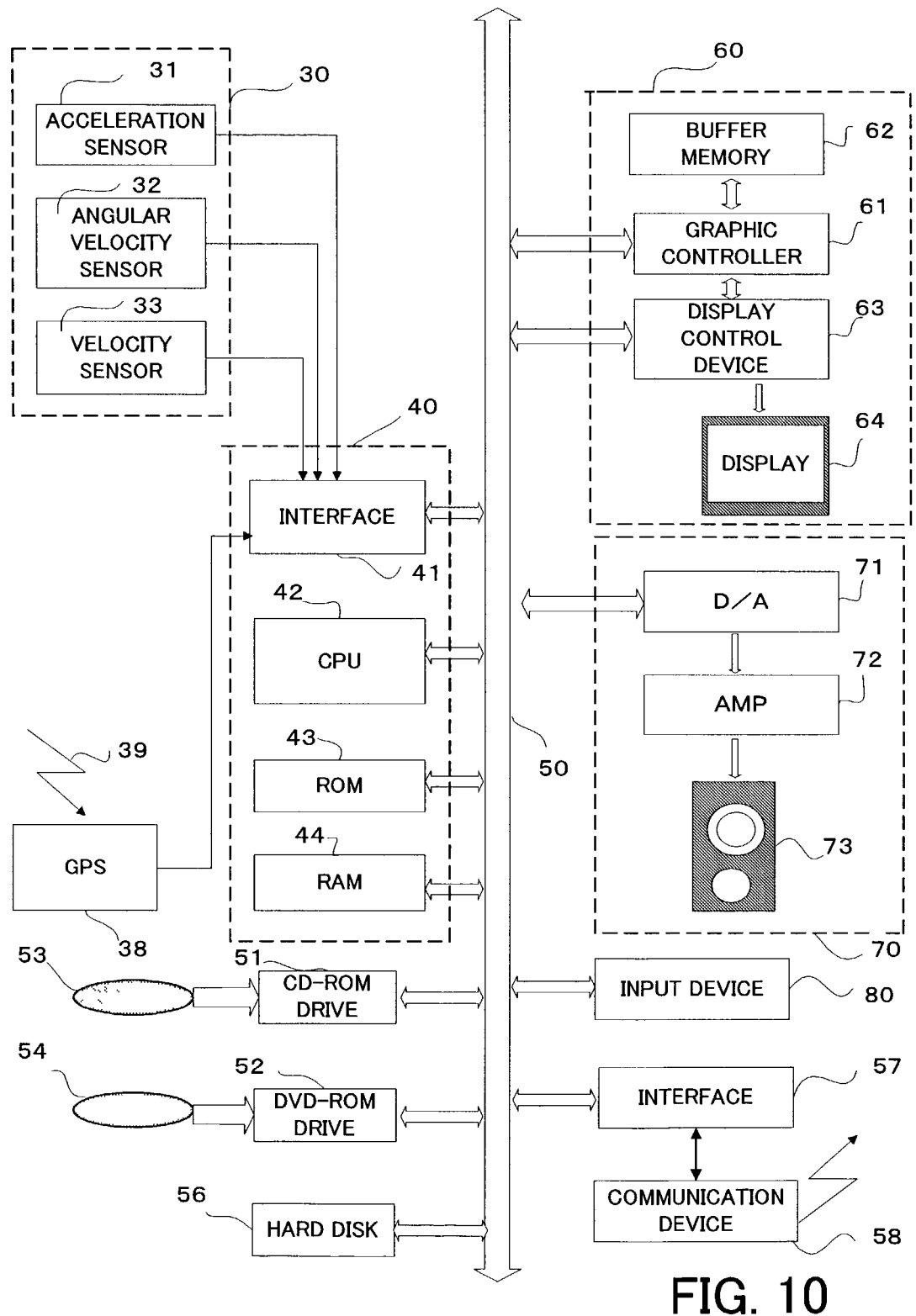
FIG. 10 is a view showing a configuration of a navigation system applied to an image generating apparatus of the present invention as a second embodiment.

At first, the navigation system of this embodiment is schematically described with reference to FIG. 10.

The navigation system is provided with a self-contained positioning apparatus 30, a GPS receiver 38, a system controller 40, an input/output (I/O) interface circuit 41, a CD-ROM drive 51, a DVD-ROM drive 52, a hard disk device (HDD) 56, a wireless communication device 58, a display unit 60, an audio output unit 70, an input device 80 and an external interface (I/F) device (not shown). The respective devices are connected to a bus line 50 for a control data transfer and a process data transfer.

The self-contained positioning apparatus 30 is constructed to include an acceleration sensor 31, an angular velocity sensor 32, and a velocity sensor 33. The acceleration sensor 31, which is constructed by a piezoelectric element, for example, detects an acceleration of a vehicle and outputs acceleration data. The angular velocity sensor 32, which is constructed by a vibration gyro, for example, detects an angular velocity of a vehicle when the vehicle changes its moving direction and outputs angular velocity data and relative azimuth data. The velocity sensor 33 detects a rotation of a vehicle shaft, mechanically, magnetically or optically, and outputs a signal of a pulse number corresponding to a car speed at every rotation for a predetermined angle around the vehicle shaft.

The GPS receiver 38 has the known configuration in which it has a plane polarization non-directional reception antenna, a high frequency reception processor, a digital signal processor (DSP) or a micro processor unit (MPU), a V-RAM, a memory and the like. The GPS receiver 38 receives the electric waves from at least three GPS satellites placed into orbit around the earth, and carries out a spectral back-diffusion, a distance measurement, a Doppler measurement, an orbit data process, and carries out a position calculation and a movement speed azimuth calculation, and continuously outputs an absolute position information of a reception point (a car driving point) from the I/O circuit 41 to the bus line 50, and the system controller 40 captures it, and carries out a screen display on a map road.

The system controller 40 is composed of a CPU (Central Processing Unit) 42, a ROM (Read Only Memory) 43 that is a non-volatile solid memory device, and a working RAM 44, and it sends and receives a data to and from the respective units connected to the bus line 50. The process control for sending and receiving this data is executed by a boot program and a control program stored in the ROM 43. In particular, the RAM 44 transiently stores the setting information to change a map display (change to an entire or district map display) through a user operation from the input device 80 and the like.

The CD-ROM drive 51 and the DVD-ROM drive 52 read out, from a CD-ROM 53 and a DVD-ROM 54, the map database information (for example, the various road data such as the number of lanes, a road width and the like in the map information (drawings) respectively stored therein, and output them.

The hard disk device 56 can store the map (image) data read by the CD-ROM drive 51 or the DVD-ROM drive 52 and then read out it at any time after it is stored. The hard disk device 56 can further store a voice data and an image data read from the CD-ROM drive 51 or the DVD-ROM drive 52. Consequently, for example, it is possible to read out the map data on the CD-ROM 53 and the DVD-ROM 54, and carry out the navigation operation, and meanwhile read out the voice data and the image data stored in the hard disk device 56 and then carry out a voice output and an image output. Or, it is possible to read out the voice data and the image data on the CD-ROM 53 and the DVD-ROM 54, and carry out the voice output and the image output, and meanwhile read out the map data stored in the hard disk device 56 and then carry out the navigation operation.

The display unit 60 displays the various process data on the screen under the control of the system controller 40. The display unit 60 controls the respective portions of the display unit 60 in accordance with the control data transferred from the CPU 42 through the bus line 50. Also, it transiently stores an image information that can be instantly displayed by a buffer memory 62 using V-RAM. Moreover, a display controller 63 carries out a display control, and displays an image data outputted from a graphic controller 61 on a display 64. This display 64 is placed near a front panel in the car.

In the audio output unit 70, a D/A converter 71 converts the voice signal transferred through the bus line 50 under the control of the system controller 40, into a digital signal. At the same time, a voice analog signal outputted from the D/A converter 71 is variably amplified by a variable amplifier (AMP) 72, outputted to a speaker 73, and outputted as a voice from it.

The input device 80 is composed of keys, switches, buttons, a remote controller, a voice input unit and the like to enter the various commands and the data. The input device 80 is placed around the display 64 and a front panel of a main body of the car electronic system installed in the car.

Here, in the navigation system, it is required to suitably display the image coincident with a drive route. That is, the image watched from the driver's view point on the road on which the driver is currently driving is desired to be displayed in the 3D image. Also, from the viewpoint of safety, it is useful to display, in the 3D image, the image when the car turns at a forward crossing and the view ahead of an unclear location, and also report its fact to the driver. Moreover, various messages need to be superimposed on the image and displayed. Such requirements of the navigation system are also the requirements of the image generating apparatus installed in the navigation system, and the image generating apparatus can satisfy these requirements, as mentioned above.

Thus, by installing the above-mentioned image generating apparatus in the navigation system and designating the navigation system so as to cooperate the image generating apparatus with the various devices of the navigation system, the extremely effective navigation system can be attained.

The cooperating operation of the image generating apparatus and the various devices of the navigation system will be described below.

As mentioned above, in the image generating apparatus, the drawing application processor 11 separately generates the coordinate transformation information of the view point, the field of view, the light source and the like and the drawing object information of the road, the building and the like. Then, the graphics library 12 separately stores and manages these two kinds of information. Then, the drawing device 13 actually generates the images by using these information.

As the drawing object information, the map information containing information of a road and a building is used. The map information is obtained from the map database of the navigation system. More concretely, the map information is stored in the CD-ROM 53 and the DVD-ROM 54 and read out through the CD-ROM drive 51 and the DVD-ROM drive 52. Also, the map information can be obtained through the communicating unit 58 from a predetermined site and stored in the hard disk device 56 to thereby use it. Also, after the map information of the drive route read out through the CD-ROM drive 51 or the DVD-ROM drive 52 is stored, it can be read out at any time. This work may be carried out when a drive plan is prepared.

The map information is divided into many regions. The divided map information included in the respective regions are represented by the various coordinate systems. Namely, in respective regions, the coordinate systems are not the same. The display list generating routine 112 of the drawing application processor 11 in the image generating apparatus converts the map information into drawing object information of a single coordinate system, which does not depend on the position of a view point and a field of view, and generates a display list on the basis of the drawing object information. Then, the drawing application processor 11 instructs the graphics library 12. In response to this instruction, the display list arranging device 122 of the graphics library 12 arranges or reconstructs the display list so as to be suitable for the drawing device 13. Then, the display list arranging device 122 stores and manages the arranged or reconstructed display list.

On the other hand, information of the view point, the field of view, the light source and the like which are used as the sources of the coordinate transformation information can be obtained in the following manner. Namely, in order to determine the view point, the field of view, the light source and the like, at first, it is necessary to know a current position of the car during the driving. This current position is measured by the GPS receiver 38 or the self-contained positioning apparatus 30 of the navigation system. Then, the location on the map information corresponding to the measured current position is determined by comparing the map information with the measured current position. Thus, the traveling direction of the car and the proper view point and field of view are determined. Incidentally, the view point and the field of view may be determined at a predetermined position or range. Moreover, these point and field may be set manually.

If the traveling direction of the car and the current time are known, the direction of the sun can be determined by considering the seasonal factor. On the basis of this, the location of the light source is determined. Also, if a view of an arrival location after a predetermined time is desired to be watched, the direction of the sun can be determined by similarly setting the position and the arrival time. Thus, it is possible to watch the image in which the effect of the position of the light source at the arrival time is reflected.

Also, the change in the shade and shadow of a view from a sunrise to a sundown can be displayed by applying the coordinate transformation information concerning the light source to the drawing object information while changing the coordinate transformation information according to the momentarily changing time. Moreover, the change of the location or the form of the 3D image can be sequentially displayed by sequentially changing the coordinate transformation information of the view point, the field of view or the like. In particular, if the change of 3D image corresponding to the change of the view when the car is continuously driving on the same road is displayed, the coordinate transformation information is changed in association with the driving while the drawing object information is fixed. Thus, the continuous change of the 3D image can be displayed efficiently.

As mentioned above, the function of the navigation system can be used to determine the scene object serving as the coordinate transformation information, and the map information can be used to determine the drawing object information. Thus, the 3D image can be generated on the basis of the coordinate transformation information and the drawing object information independently of each other. The image is introduced into the display unit 60 of the navigation system, and accumulated in the buffer memory 62 using the V-RAM and the like by the graphic controller 61, and read out from it, and then displayed on the display 64 through the display controller 63.

As mentioned above, the image generating apparatus of the present invention has been described by exemplifying the case of the application to the navigation system. However, it is not limited to this case. Preferably, it may be used for the image generation in a personal computer, a work station, a mobile, a portable telephone and the like, the image generation in a television game, an arcade game, a portable game and the like, and the image generation in a handling simulation apparatus or a training apparatus for various mobile bodies such as a car, a motorcycle, an airplane, a helicopter, a rocket, a ship and the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-295152 filed on Sep. 26, 2001 including the specification, claims, drawings and summary is incorporated herein by reference in its entirety.

What is claimed is:

1. An image generating apparatus for drawing a three-dimensional image comprising:
    a drawing object information generating device for generating drawing object information, which is information for drawing objects as the three-dimensional image, in a single coordinate system;
    a coordinate transformation information generating device for generating coordinate transformation information, which is information for defining a view point, a field of view, or both of the view point and the field of view concerning the three-dimensional image, separately and independently from the drawing object information;
    a drawing object information storing device for storing the drawing object information, separately and independently from the coordinate transformation information;
    a coordinate transformation information storing device for storing the coordinate transformation information, separately and independently from the drawing object information; and
    a drawing device for carrying out an image generating process of generating the three-dimensional image by using the drawing object information that is directly input from said drawing object information storing device to said drawing device and the coordinate transformation information that is directly input from said coordinate transformation information storing device to said drawing device, and for supplying the three-dimensional image to a display device,
    wherein the drawing object information generating device generates, in advance, not only the drawing object information corresponding to the objects to be displayed in the image generating process that carries out now but also the drawing object information corresponding to other objects that expected to be displayed in the image generating process that carries out at a different time, the drawing object information storing device stores the generated drawing object information corresponding to the other objects, and the drawing device generates the three-dimensional image corresponding to said other objects by using the drawing object information corresponding to said other objects stored in advance, and
    wherein the drawing object information and the coordinate transformation information are separately and independently generated, stored, and managed before the generation of the three-dimensional image by said drawing device.

2. An image generating apparatus according to claim 1, wherein said other objects are objects that exist in a peripheral region of a current field of view.

3. An image generating apparatus according to claim 1, wherein said other objects are objects that exist in a region located ahead of a current field of view located ahead of a view point of a viewer.

4. An image generating apparatus according to claim 1, wherein the drawing object information generates the drawing object information corresponding to the objects that exist within a region broader than a current field of view.

5. An image generating apparatus according to claim 1 further comprising:
    a changing information supplying device for supplying changing information that indicates a change of the view point, the field of view, or both of the view point and the field of view, to the coordinate transformation information generating device,
    wherein the coordinate transformation information generating device generates the coordinate transformation information on the basis of the supplied changing information.

6. An image generating apparatus according to claim 1, wherein the drawing device generates the three-dimension image whenever the coordinate transformation information generated by the coordinate transformation information generating device is changed.

7. An image generating apparatus according to claim 1, wherein the drawing object information generating device includes a list generating device for generating a list of the drawing object information, and
    the list generating device generates, in advance, not only the list of the drawing object information corresponding to the objects to be displayed in the image generating process that carries out now but also the list of the drawing object information corresponding to said other objects that expected to be displayed in the image generating process that carries out at the different time.

8. An image generating apparatus according to claim 1, wherein the image generating apparatus includes a drawing application processor and a graphics library,
    the graphics library comprises:
    the drawing object information storing device;
    the coordinate transformation information storing device; and
    a controlling device for controlling the drawing device, and
    the drawing application processor comprises:
    the drawing object information generating device;
    the coordinate transformation information generating device; and
    an instructing device for instructing the controlling device to execute the generation of the three-dimensional image.

9. An image generating apparatus according to claim 1, further comprising:
    a map information supplying device for supplying map information, which contains a source of the drawing object information, to the drawing object information generating device.

10. An image generating apparatus according to claim 1, further comprising:
 a view point setting device for setting the information for defining the view point on the basis of a current position of a viewer.

11. An image generating apparatus according to claim 1, wherein the drawing device generates the three-dimensional image with perspective.

12. An image generating apparatus according to claim 1, wherein the coordinate transformation information includes information for defining a light source.

13. An image generating apparatus according to claim 1, wherein the information for defining the view point is set on the basis of a view point of a movable body operator.

14. An image generating apparatus according to claim 1, wherein the coordinate transformation information defines the field of view on the basis of a field of view of a movable body operator.

15. An image generating apparatus according to claim 1, wherein the view point on the three-dimensional image is set so as to be located at a central portion of a display area of a display device.

16. An image generating apparatus according to claim 1, wherein the drawing device generates a plurality of partial frame images on the basis of the stored drawing object information, and superimposes the plurality of partial frame images.

17. An image generating apparatus according to claim 16 further comprising a frame buffer for storing the plurality of partial frame images.

18. An image generating apparatus according to claim 1, wherein the coordinate transformation information generating device generates a plurality of units of the coordinate transformation information, in which a view point, a field of view, or both of the view point and the field of view is/are different from each other, with respect to one unit of the drawing object information, and the image processing device generates the three-dimensional image which changes with time by applying the plurality of units of the coordinate transformation information to the one unit of the drawing object information.

19. An image generating apparatus according to claim 1, wherein a process of generating the drawing object information in the drawing object information generating device, a process of generating the coordinate transformation information in the coordinate transformation information generating device, a process of storing the drawing object information in the drawing object information storing device and a process of storing the coordinate transformation information in the coordinate transformation information storing device are carried out with multitasking.

20. An image generating apparatus according to claim 1 further comprising:
 a display device for displaying the images generated by the drawing device.

21. A program storage device readable by a computer for tangibly embodying a program of instructions executable by the computer to perform an image generating method of drawing a three-dimensional image, the image generating method comprising:
 a drawing object information generating process of generating drawing object information, which is information for drawing objects as the three-dimensional image, in a single coordinate system;
 a coordinate transformation information generating process of generating coordinate transformation information, which is information for defining a view point, a field of view, or both of the view point and the field of view concerning the three-dimensional image, separately and independently from the drawing object information;
 a drawing object information storing process of storing the drawing object information, separately and independently from the coordinate transformation information;
 a coordinate transformation information storing process of storing the coordinate transformation information, separately and independently from the drawing object information; and
 a drawing process of carrying out an image generating process of generating the three-dimensional image by using the drawing object information that is directly input from a drawing information storing device that stores the drawing object information, and the coordinate transformation information that is directly input from a coordinate transformation information storing device that stores the coordinate transformation information, and for supplying the three-dimensional image to a display device,
 wherein: in the drawing object information generating process, not only the drawing object information corresponding to the objects to be displayed in the image generating process that carries out now but also the drawing object information corresponding to other objects that expected to be displayed in the image generating process that carries out at a different time is generated in advance;
 in the drawing object information storing process, the generated drawing object information corresponding to said other objects is stored; and
 in the drawing process, the three-dimensional image corresponding to said other objects is generated by using the drawing object information corresponding to said other objects stored in advance; and
 wherein the drawing object information and the coordinate transformation information are separately and independently generated, stored and managed before the generation of the three-dimensional image by the drawing device.

22. An image generating method of drawing a three-dimensional image comprising:
 a drawing object information generating process of generating drawing object information, which is information for drawing objects as the three-dimensional image, in a single coordinate system;
 a coordinate transformation information generating process of generating coordinate transformation information, which is information for defining a view point, a field of view, or both of the view point and the field of view concerning the three-dimensional image, separately and independently from the drawing object information;
 a drawing object information storing process of storing the drawing object information, separately and independently from the coordinate transformation information;
 a coordinate transformation information storing process of storing the coordinate transformation information, separately and independently from the drawing object information; and
 a drawing process of carrying out an image generating process of generating the three-dimensional image by using the drawing object information that is directly input from a drawing object information storing device that stores the drawing object information, and the coordinate transformation information that is directly input from a coordinate transformation information storing device that stores the coordinate transformation information, and for supplying the three-dimensional image to a display device, wherein: in the drawing object information generating process, not only the drawing object information corresponding to the objects to be displayed in the image generating process that carries out now but also the drawing object information corresponding to other objects that expected to be displayed in the image generating process that carries out at a different time is generated in advance;

in the drawing object information storing process, the generated drawing object information corresponding to said other objects is stored; and in the drawing process, the three-dimensional image corresponding to said other objects is generated by using the drawing object information corresponding to said other objects stored in advance; and wherein the drawing object information and the coordinate transformation information are separately and independently generated, stored and managed before the generation of the three-dimensional image by the drawing device.

23. An image generating method according to claim 22, wherein said other objects are objects that exist in a peripheral region of a current field of view.

* * * * *